(12) United States Patent
Barraclough et al.

(10) Patent No.: US 10,440,140 B2
(45) Date of Patent: Oct. 8, 2019

(54) BROWSER CACHE MANAGEMENT

(71) Applicant: Apple Inc., Cupertino, CA (US)

(72) Inventors: Gavin Barraclough, Sunnyvale, CA (US); Antti Koivisto, Helsinki (FI); Christophe Dumez, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 619 days.

(21) Appl. No.: 15/098,231

(22) Filed: Apr. 13, 2016

(65) Prior Publication Data

US 2017/0094004 A1 Mar. 30, 2017

Related U.S. Application Data

(60) Provisional application No. 62/234,572, filed on Sep. 29, 2015.

(51) Int. Cl.
*H04L 29/08* (2006.01)
(52) U.S. Cl.
CPC ...... *H04L 67/2842* (2013.01); *H04L 67/2847* (2013.01)
(58) Field of Classification Search
CPC .......... H04L 67/2842; H04L 67/2847
USPC .......... 709/223, 201, 203
See application file for complete search history.

(56) References Cited

U.S. PATENT DOCUMENTS

| | | | |
|---|---|---|---|
| 6,453,319 B1 * | 9/2002 | Mattis | G06F 17/30902 |
| 7,360,025 B1 | 4/2008 | O'Connell et al. | |
| 8,417,892 B1 | 4/2013 | Roskind et al. | |
| 9,083,761 B1 | 7/2015 | Belshe | |
| 2009/0037661 A1 | 2/2009 | Fairhurst | |
| 2013/0031459 A1 * | 1/2013 | Khorashadi | G06F 17/30905 715/234 |

* cited by examiner

*Primary Examiner* — Chirag R Patel
*Assistant Examiner* — Marshall M McLeod
(74) *Attorney, Agent, or Firm* — Dickinson Wright RLLP

(57) ABSTRACT

Disclosed herein is a technique for storing and managing a number of resources and sub-resources associated with web pages in a cache implemented by a web browser. Metadata associated with the sub-resources is captured and stored in the cache. The metadata can include relationship or dependency information associated with a main resource and the sub-resources associated with the main resource. The previously captured metadata is used to predict any sub-resources that will be needed to properly display the web page and the predicted sub-resources are requested from the web server concurrently with a request for the main resource associated with the web page.

20 Claims, 9 Drawing Sheets

BROWSER CACHE MANAGEMENT

The present application claims the benefit of U.S. Provisional Application No. 62/234,572, entitled "BROWSER CACHE MANAGEMENT" filed Sep. 29, 2015, the content of which is incorporated herein by reference in its entirety for all purposes.

FIELD

The described embodiments set forth a technique for managing a number of resources and sub-resources associated with web pages in a cache implemented by a web browser.

BACKGROUND

Generally, a user views web pages via a web browser implemented by a user device. When the user wishes to visit a web page, he/she usually inputs a Uniform Resource Locator ("URL") into the web browser. The web browser processes the URL and sends a request for the web page to a web server that hosts the web page. When the web server receives the request, the web server processes the request and formulates a response in the form of a HTML (Hyper Text Mark-up Language) document/file. The HTML document can contain references to a set of sub-resources that are needed to properly display the web page. The web server responds to the request by sending the HTML document to the web browser. The web browser parses the HTML document to identify the needed sub-resources. The web browser then asynchronously requests the needed sub-resources from the web server. Depending on the number of needed sub-resources, the web browser may need to communicate with the web server numerous times to acquire all of the web page's sub-resources. Notably, the back and forth communications between the web browser and the web server to obtain the needed sub-resources create latency and degrade the user experience by increasing the time required to properly display the web page.

SUMMARY

Representative embodiments set forth herein disclose various techniques for storing and managing a number of resources and sub-resources associated with web pages in a cache implemented by a web browser. When a particular web page is requested/loaded from a web server for the first time, a main resource associated with the web page is parsed, a number of sub-resources needed to properly display the web page are identified, and metadata associated with the sub-resources is captured and stored in the cache. Relationship or dependency information associated with the main resource and the sub-resources can be determined based on the metadata. For any subsequent requests for the web page, the previously captured metadata and the relationship/dependency information is utilized to predict any sub-resources that will be needed to properly display the web page and the predicted sub-resources are requested from the web server concurrently with the request for the web page. By storing the metadata in the cache and utilizing the metadata to predict the various needed sub-resources, the needed sub-resources associated with the web page can be requested while the request for the web page is being processed, which can reduce latency issues associated with obtaining these sub-resources from the web server.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for predicting resources needed for displaying a web page based on historical information associated with the web page that is persistently stored in a cache. The historical information can include metadata and dependency information associated with the resources that is tracked and updated based on a number of previous page loads of the web page. By utilizing the historical information stored in the cache, the resources needed for the web page can be predicted and the predicted resources can be requested from a web server at the time a request for the web page is communicated to the web server.

Accordingly, the techniques described herein provide a mechanism for storing and managing resources and sub-resources associated with web pages in the cache implemented by a web browser. A more detailed discussion of these techniques is set forth below and described in conjunction with FIGS. 1-5, FIGS. 6A-6C, and FIG. 7, which illustrate detailed diagrams of systems and methods that can be used to implement these techniques.

Figure 1:
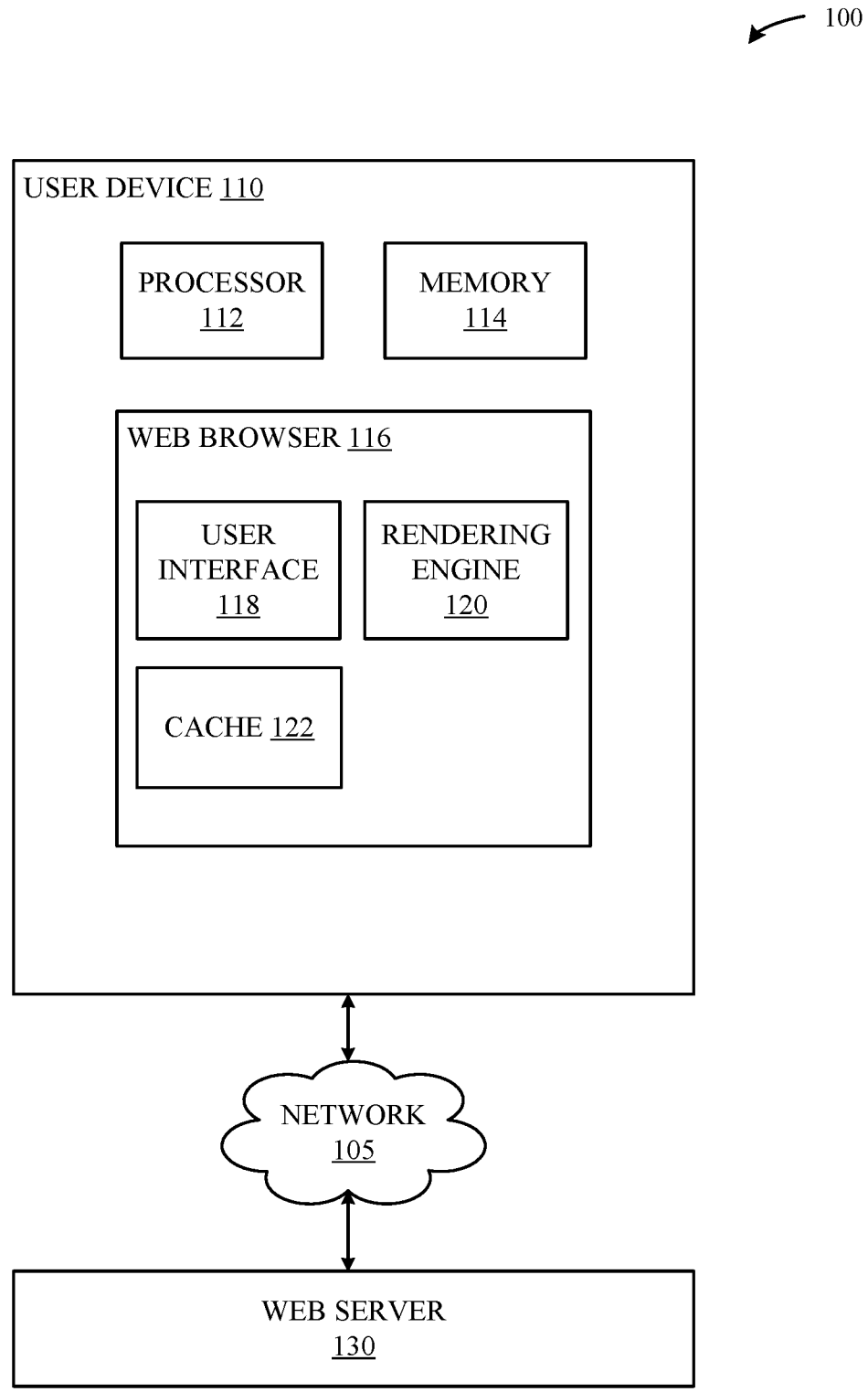
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 that can represent a computing device (e.g. iPhone, iPad, MacBook, or any other computing device by Apple®). A processor 112, in conjunction with the memory 114, can implement an operating system (OS) (e.g. iOS, or any other operating system) that is configured to execute various applications (e.g. native OS applications and user applications) and other processes/services on the user device 110. The user device 110 can communicate with a web server 130 via a network 105. The network 105 can include one or more of the Internet, an intranet, a PAN (Personal Area Network), a LAN (Local Area Network), a WAN (Wide Area Network), a MAN (Metropolitan Area Network), a wireless communication network, and other network or combination of networks.

As shown in FIG. 1, the user device 110 can include a web browser 116 that is configured to request and retrieve web pages or other content from the web server 130, and render/display the web pages in a browser window at the user device 110. The web browser 116 can include a user interface 118, a rendering engine 120, a cache 122, and/or other components. The user interface 118 allows a user to interact with the web browser 116 and can include an address bar where a user can input a Uniform Resource Locator ("URL") of a web page he/she wishes to visit. The user interface 118 can also include back and forward buttons, bookmarking options, refresh and stop buttons, and/or other user interface options that allow the user to manipulate the web page being displayed by the web browser 116. The rendering engine 120 is configured to parse and display the web page requested by the user in the browser window. The cache 122 is configured to temporarily store web page data associated with web pages visited by the user in a local storage system of the user device 110.

Figure 2:
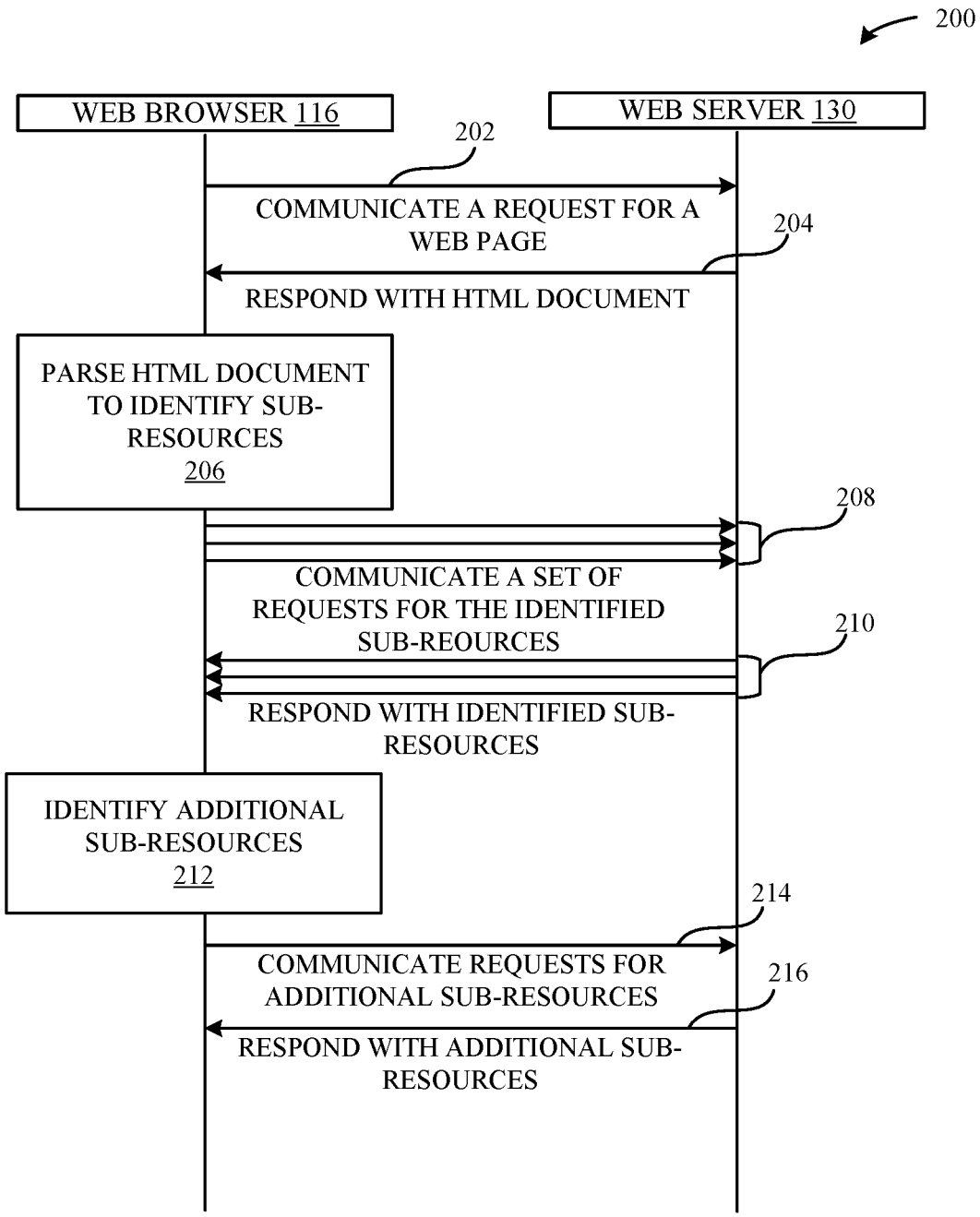
FIG. 2 illustrates a sequence diagram of a method for processing web page requests associated with a web browser of FIG. 1, according to some embodiments.

In some implementations, a user inputs the URL of a web page in the address bar of the user interface 118, which causes the web browser 116 to communicate a request for the web page to the web server 130, at step 202 of FIG. 2, for example. A typical web page can contain a top-level HTML (Hyper Text Mark-up Language) document/file (also referred to hereinafter as, "main resource") and a set of sub-resources that are needed to properly load/display the web page. The set of sub-resources can include scripts, style sheets, images, and/or other types of sub-resources. At step 204, the web server 130 responds to the request by sending the HTML document back to the web browser 116. At step 206, the web browser 116 parses the HTML document and identifies the set of sub-resources needed to display the web page. When the set of needed sub-resources are identified, the web browser 116, at step 208, communicates a set of requests for the identified sub-resources to the web server 130. The web server 130 processes the set of requests and responds back to the web browser 116 with the identified sub-resources, at step 210. The web browser 116 can, at step 212, parse the sub-resources received from the web server 130 to identify any additional sub-resources that are needed. The web browser 116 can communicate further requests to the web server 130 for the additional sub-resources, at step 214. At step 216, the web server 130 responds back to the web browser 116 with the additional sub-resources. In this manner, the web browser 116 and web server 130 can communicate with one another until all needed sub-resources are obtained by the web browser 116. After all the needed sub-resources are obtained, the web page is completely loaded/rendered by the rendering engine 120.

Referring back to FIG. 1, the cache 122 can store a copy of the web page's resources and sub-resources when the web page is loaded (i.e. requested by the user). In response to a web page request, the web browser 116 queries the cache 122 for the web page's main resource prior to requesting it from the web server 130. If the main resource does not exist in the cache 122, the web browser 116 requests the main resource from the web server 130 and saves the received main resource to the cache 122, if permitted. If the main resource exists in the cache 122, the cached resource is provided to the web browser 116, which is faster than requesting the main resource from the web server 130. The web browser 116 then determines whether any sub-resources are needed (based on parsing the main resource) and queries the cache 122 for the needed sub-resources. If the sub-resources do not exist in the cache 122, the web browser 116 requests the sub-resources from the web server 130 and saves the received sub-resources to the cache 122, if permitted. If the sub-resources exist in the cache 122, the cached sub-resources are provided to the web browser 116. This process is repeated until all the web page's resources/sub-resources are obtained. Saving the main resource/sub-resources in the cache 122 when the cache 122 does not have these resources allows the resources to be loaded from the cache 122 for any subsequent requests for the web page. In some implementations, loading the resources from the cache can involve performing expiration checks (i.e. whether a resource has expired or not), change checks (i.e. whether a resource has changed at the web server), and the like. In these cases, the web browser 116 communicates with the web server 130 to perform the checks even though the resources/sub-resources are available in the cache 122. In some implementations, the checks are performed based on information obtained via HTTP headers associated with the resources. For example, an HTTP header associated with a resource can indicate how long the resource is valid or an expiration time associated with the resource.

According to some embodiments, in an advanced approach, the cache 122 stores metadata regarding the web page's resources/sub-resources. When the user requests the web page for the first time (and as the web browser 116 is loading/rendering the web page for the first time), the web browser 116 captures the metadata associated with the main resource and any associated sub-resources as the resource/sub-resources are retrieved from the web server 130 and saves the metadata in the cache 122. The metadata can include a URL of the main resource/sub-resource (the URL containing the file name and extension of the main resource/sub-resource), a type of main resource/sub-resource (e.g. static or transient), and/or other information. The web page can contain some resources/sub-resources that are static or do not change (e.g. page structure/layout, masthead, etc.) and some resources/sub-resources that are transient or change over time or with every page load. For example, a New York Times cover page article and pictures associated with the article are transient (as they can change every day) but the masthead information is static (as it remains the same with every page load). In some implementations, the static resources can be cached whereas the transient resources are not cached.

Figure 3:
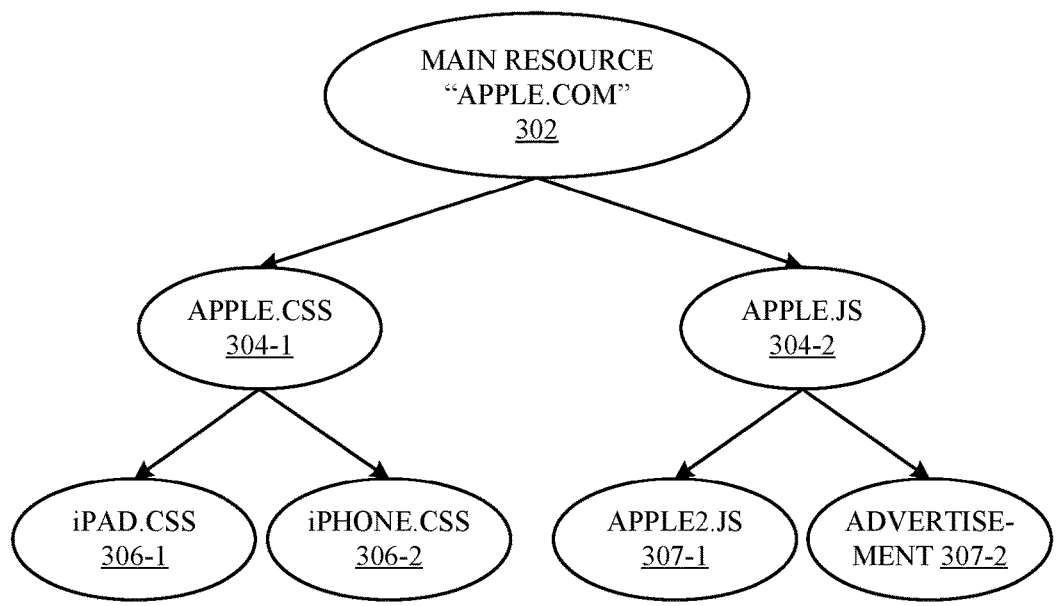
FIG. 3 illustrates an exemplary dependency graph stored in the cache implemented by the web browser of FIG. 1, according to some embodiments.

According to some embodiments, based on the metadata, the cache 122 can determine/generate relationship or dependency information associated with the main resource and the sub-resources and save the relationship/dependency information (also as part of the metadata) in the cache 122. In some implementations, the cache 122 can generate a dependency graph that represents the relationship/dependency information. FIG. 3 depicts an exemplary dependency graph 300 for "apple.com". The main top-level node 302 of the dependency graph represents the main resource for "apple.com". The next layer of the dependency graph 300 includes nodes 304-1 and 304-2 that represent the Cascading Style Sheet and JavaScript sub-resources associated with the main resource, respectively. The following layer of the dependency graph 300 includes nodes 306-1 and 306-2 that represent additional sub-resources associated with the Cascading Style Sheet sub-resource, and nodes 307-1 and 307-2 that represent additional sub-resources associated with the JavaScript sub-resource. In some implementations, resources/sub-resources in the dependency graph 300 can be marked as static or transient. For example, node 307-2 that represents an advertisement that changes with every page load can be marked as transient. As will be appreciated, each layer of the dependency graph 300 can include any number of nodes that can represent any number of sub-resources associated with resources/sub-resources in the previous layer. Also, while the dependency graph 300 is depicted as a mechanism for representing the relationship/dependency information, other mechanisms can be utilized without departing from the scope of the disclosure. For example, the relationship/dependency information can be represented by a logical list of resources/sub-resources.

In some implementations, when a subsequent request for the web page is received, the cache 122 can determine whether it stores metadata/dependency information associated with the main resource. In response to a determination that the metadata/dependency information is not stored in the cache 122, the main resource and associated sub-resources are requested from the web server 130 (as depicted in FIG. 2, for example). In response to a determination that the metadata/dependency information is stored in the cache 122, the metadata/dependency information is analyzed to predict any sub-resources that are likely to be needed or will be needed to properly display the web page. For example, when the user requests the web page "apple.com", the cache 122 can fetch the dependency graph 300 associated with "apple.com", analyze the dependency graph 300, and predict that the sub-resources "Apple.CSS", "Apple.JS", "iPad.CSS", "iPhone.CSS", and "Apple2.JS" will be needed to display the web page. In some implementations, any sub-resources that are marked as transient (e.g. "Advertisement") are not included in the prediction. The cache 122 can determine whether any sub-resources in the dependency graph 300 are marked as transient. When a particular resource is marked as transient, the cache 122 does not include the particular resource in the prediction. In some implementations, in response to the prediction from the cache 122, a set of requests for the predicted sub-resources can be communicated to the web server 130.

Figure 4:
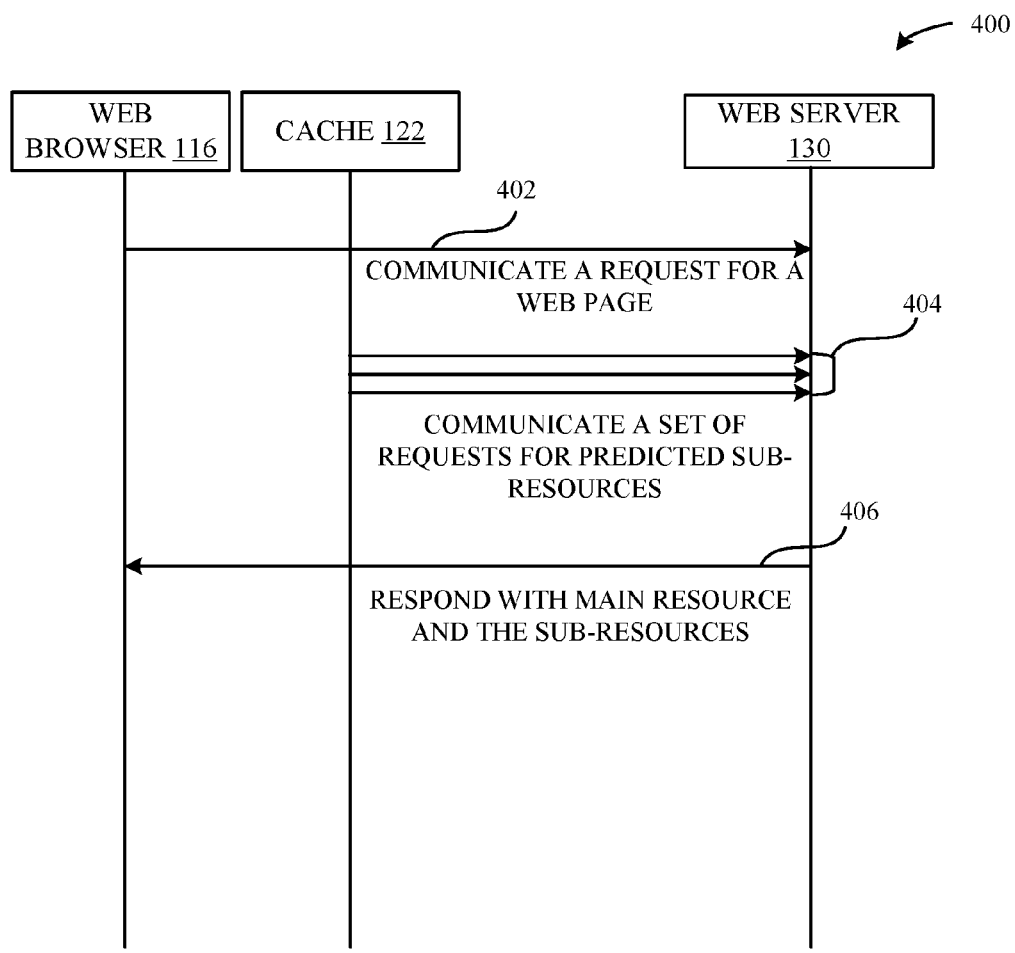
FIG. 4 illustrates a sequence diagram of a method for processing sub-resource requests based on metadata stored in a cache implemented by the web browser of FIG. 1, according to some embodiments.

For example, as shown in FIG. 4, when a request for the web page or main resource is communicated to the web server 130 (at step 402), a set of requests for the predicted sub-resources can also be concurrently communicated to the web server 130, at step 404. The web server 130 can respond back to the web browser 116 with the main resource and the requested sub-resources, at step 406. In this manner, by utilizing the metadata/dependency information stored in the cache 122, multiple back and forth communications between the web browser 116 and the web server 130 (as depicted in FIG. 2, for example) to obtain the sub-resources can be avoided and delays associated with obtaining the sub-resources from the web server 130 are substantially eliminated.

According to some embodiments, the cache 122 can predict resources that will be needed based on historical information that is collected over multiple page loads of the web page. The historical information is stored in the cache 122 and can include the metadata captured over the multiple page loads and the dependency information generated/updated over the multiple page loads. For example, the dependency graph 300 can be updated to reflect current relationships/dependencies between the main resource and the associated sub-resources. In this manner, when a request for a particular web page is received, the historical information associated with previous loads of the particular web page is utilized by the cache 122 to predict the resources/sub-resources that will be needed for rendering/loading the web page. In other words, the cache 122 learns from the previous loads, which resources/sub-resources were needed for the previous loads, and then predicts based on the learnt historical information, whether a particular resource/sub-resource will be needed for a current page load. In some implementations, machine learning techniques can be utilized by the cache 122 to learn from and make predictions based on the historical information associated with previous loads of the web page.

In some implementations, the cache 122 keeps track of which sub-resources are used or needed (and their frequency of use) over multiple requests of the main resource associated with the web page or multiple page loads of the web page. The cache 122 can use counters that evolve over time and highlight resources/sub-resources that are most frequently used in associated with displaying the web page. For example, when the web page is loaded for the first time, the counter for each resource/sub-resource is set to 1. For subsequent page loads, the cache 122 predicts the resources/sub-resources that will be needed and when the web page actually uses or needs a particular predicted resource/sub-resource for rendering the web page, the counter for the particular resource/sub-resource is increased. In this manner, a counter for a resource/sub-resource that is consistently used for rendering the web page will be greater than the counter for an unneeded resource/sub-resource.

Figure 5:
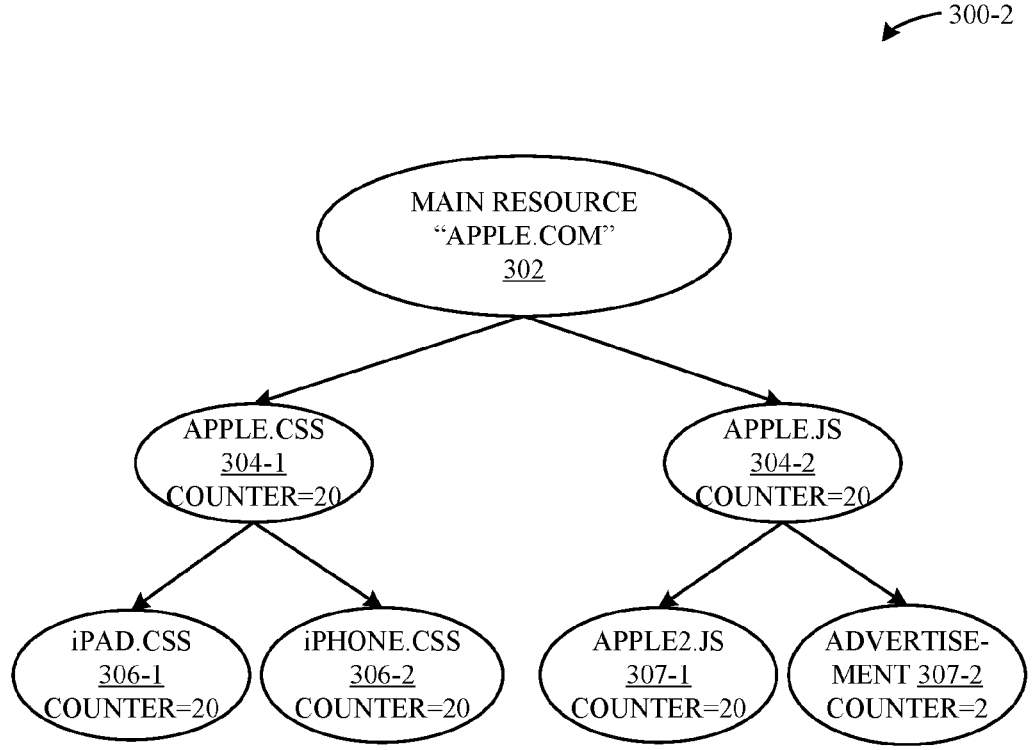
FIG. 5 illustrates an exemplary dependency graph stored in the cache implemented by the web browser of FIG. 1, according to some embodiments.

According to some embodiments, the counter values associated with the resources/sub-resources can be stored/tracked with the dependency graph 300. FIG. 5 depicts the dependency graph 300 where each node is associated with a counter value indicating the frequency of use of the sub-resource associated with the node. For example, nodes 304-1, 304-2, 306-1, 306-2, and 307-1 have a counter value of "20" associated with them whereas, the node 307-2 has a counter value of "2" associated with it. This indicates that the sub-resources associated with nodes 304-1, 304-2, 306-1, 306-2, and 307-1 are more frequently used for rendering the web page in comparison to the sub-resource associated with node 307-2. The cache 122 can utilize this historical information (that includes the counter values) to predict that the sub-resources associated with nodes 304-1, 304-2, 306-1, 306-2, and 307-1 will most likely be needed for a current page load of the web page. In some implementations, all sub-resources associated with nodes having counter values greater than a threshold value are determined as being likely to be needed for the current page load. Other mechanisms can be utilized to keep track of which sub-resources were used and their frequency of use, for example, applying weights, maintaining scores, and the like.

In some implementations, certain nodes from the dependency graph 300 whose counters have not been updated for a threshold amount of time are purged. This allows for pruning of irrelevant/unused nodes in the dependency graph 300.

Figure 6A:
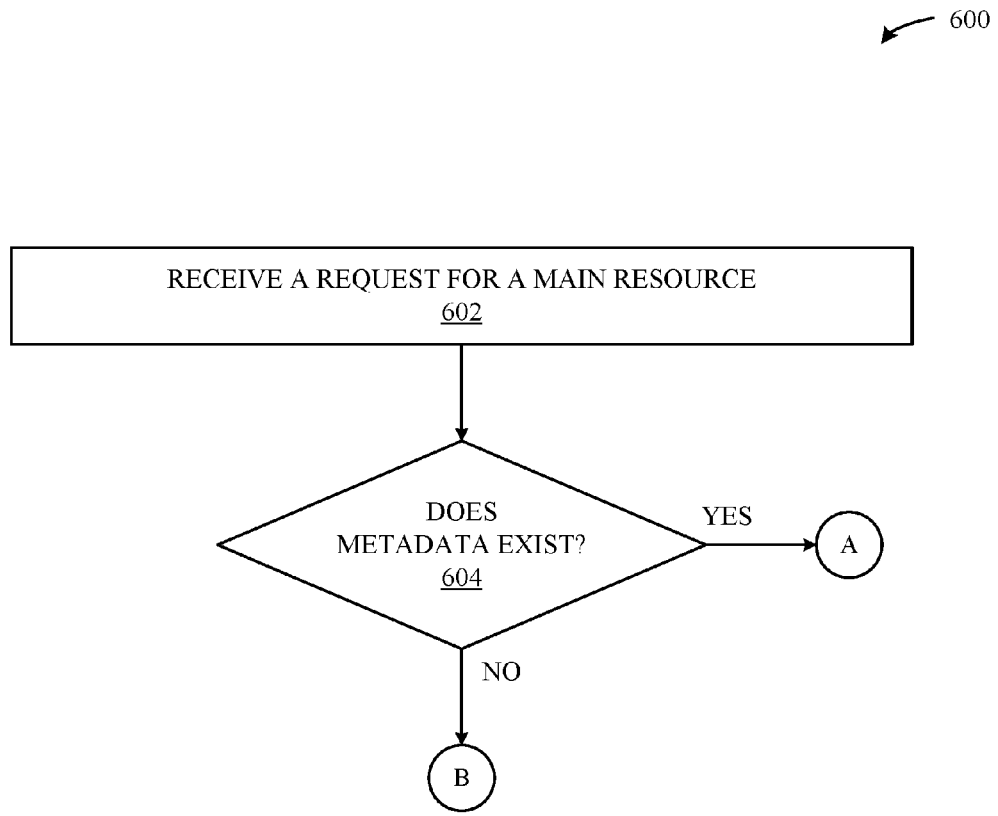
FIGS. 6A-6C illustrate a method that is carried out by the cache implemented by the web browser of FIG. 1, according to some embodiments.
Figure 6B:
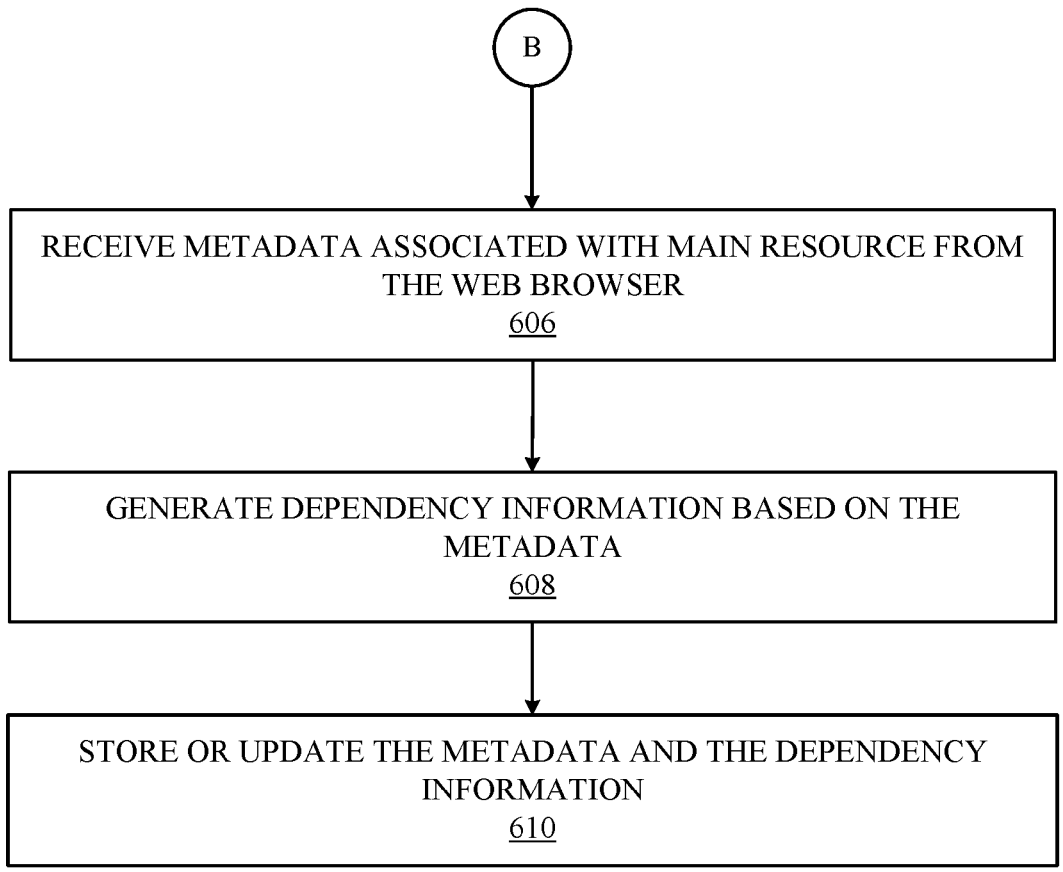
Figure 6C:
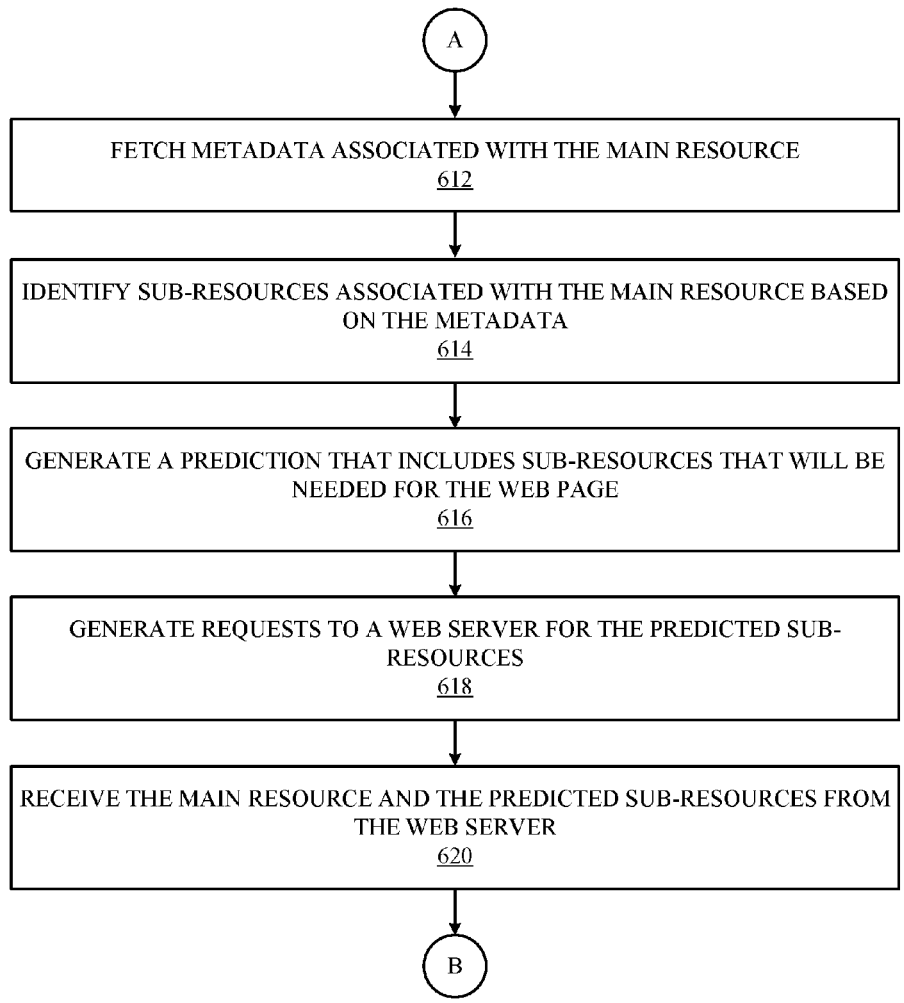

FIGS. 6A-6C illustrate a method 600 that is carried out by the cache 122 implemented by the user device 110 of FIG. 1, according to one embodiment. As shown in FIG. 6A, the method 600 begins at step 602, where the cache 122 receives a request for a main resource associated with a web page. The cache 122 can receive the request to load the main resource from the web browser 116. In some implementations, receipt of the request triggers the cache 122 to fetch metadata associated with the main resource. At step 604, in response to the request, the cache 122 determines whether metadata associated with the main resource exists in the cache 122. Referring to FIG. 6B, in response to a determination that the metadata does not exist in the cache 122 (for example, when the main resource is requested for the first time), the cache 122 can receive, from the web browser 116, the metadata associated with the main resource and the corresponding sub-resources, at step 606. The cache 122 can parse the received metadata and generate dependency information (e.g. the dependency graph 300) based on the received metadata, at step 608. The cache 122 can then locally store the dependency information as metadata in the cache 122, at step 610. In some implementations, the metadata stored in the cache can include a list of URLs of sub-resources associated with the URL of the main resource. In some implementations, the metadata stored in the cache 122 represents information regarding sub-resources that were requested from the web server 130 by the web browser 116 for purposes of rendering the web page.

Referring to FIG. 6C, in response to a determination that metadata associated with the main resource exists in the cache 122 (for example, when the same main resource is subsequently requested), the cache 122 can fetch/retrieve the previously stored metadata associated with the main resource, at step 612. The cache 122 can parse the fetched metadata to identify sub-resources associated with the main resource, at step 614. The cache 122, at step 616, generates a prediction that includes sub-resources that will be needed for rendering the web page. In some implementations, the cache 122 parses the metadata and identifies the sub-resources that were requested from the web server 130 the last time web page was loaded. In some implementations, the cache 122 can generate a prediction that includes all or a subset of the identified sub-resources. At step 618, the cache 122 generates a number of requests to the web server 130 for the sub-resources included in the prediction. In some implementations, the requests for the predicted sub-resources are communicated to the web server 130 concurrently with the request for the main resource. At step 620, the cache 122 receives the main resource and the predicted sub-resources from the web server 130. In some implementations, the cache 122 performs steps 606-610 (as depicted in FIG. 6B) to receive metadata associated with the main resource and the predicted sub-resources, parse the metadata, generate dependency information based on the metadata, and update the dependency information associated with the main resource stored in the cache 122.

In some implementations, a determination is made regarding whether the predicted sub-resources received from the web server 130 were actually used to render the web page in order to generate a confidence level associated with the prediction. For any sub-resources that were actually used to render the web page, the metadata (e.g. dependency graph 300) stored in the cache 122 is updated to reflect such use (in the form of counter values described above, for example). This information (e.g. historical information) is collected over multiple requests for the same main resource and is used to refine the prediction generated by the cache 122. In this manner, the confidence level of the prediction will increase over time as the cache 122 will most likely predict sub-resources that will actually be used for rendering the web page. In some implementations, historical information associated with a particular number of previous loads (e.g. 5 previous page loads) can be used to generate the prediction.

In some implementations, in addition to or instead of capturing metadata associated with a particular web page or URL, metadata can be captured across all web pages associated with a particular domain or a particular URL pattern/path because a lot of information across these web pages may be common. For example, the user may browse different articles on the New York Times website where each article represents a different web page with a different URL. In this scenario, metadata associated with each of these web pages is captured and a dependency graph is generated based on the top level domain (e.g. nytimes.com), a URL pattern/path (e.g. nytimes.com/articles) and/or a particular web page or URL (e.g. nytimes.com/articles/abc123.html). In some implementations, when a main resource associated with a web page is requested, one or more of these dependency graphs can be consulted/utilized for generating the prediction, and updated based on the prediction. In cases where a particular requested web page has not been visited by the user before, the cache 122 can recognize the URL pattern/path associated the web page and generate the prediction based on the metadata associated with the URL pattern/path.

According to some embodiments, a cloud-based service can be utilized to generate and provide the predictions to the cache 122 based on the historical information collected by the cloud-based service and/or cache 122. The cloud-based service can be implemented on a remote server that is located in close proximity to the user (and provides a reliable communication path to the user device 110). In these embodiments, when the cache 122 receives the request for the main resource, the cache 122 issues a request to the cloud-based service to provide the predictions for sub-resources that are likely to be needed by the web page. The cache 122 can then issue the requests to the web server 130 for the sub-resources included in the prediction provided by the cloud-based service. The cloud-based service can capture metadata by visiting web sites, loading the associated pages, and saving the associated metadata. The cloud-based service can also capture metadata by crowdsourcing this information from multiple users viewing multiple web pages on their respective user devices. Thus, as users load web pages on their respective devices, metadata associated with the page loads is captured and stored locally in the respective caches and also communicated to the cloud-based service. In some implementations, when the cloud-based service provides a particular prediction to the cache 122, a confidence level associated with the prediction is generated and the cloud-based service is notified of the confidence level. For example, if the cloud-based service provided a prediction that indicated that sub-resources A, B, C, and D will be needed, but only sub-resources A and B were actually needed by the web page, the cloud-based service can be notified that the prediction it provided was 50% accurate, where the notification can also include the list of sub-resources that were accurately predicted, for example A and B.

It will be understood that while the various embodiments have been described herein with respect to a web page, web browser, and a web server, the disclosure is not so limited, and can be applied to any multipart network resource (i.e. a network resource with a number of related or associated resources/sub-resources) being loaded over a network from a resource-based server for purposes of accelerating the loading of its associated sub-resources. For example, the multipart network resource can comprise a news article (with multiple related pages) that is being loaded by a news-based application.

Figure 7:
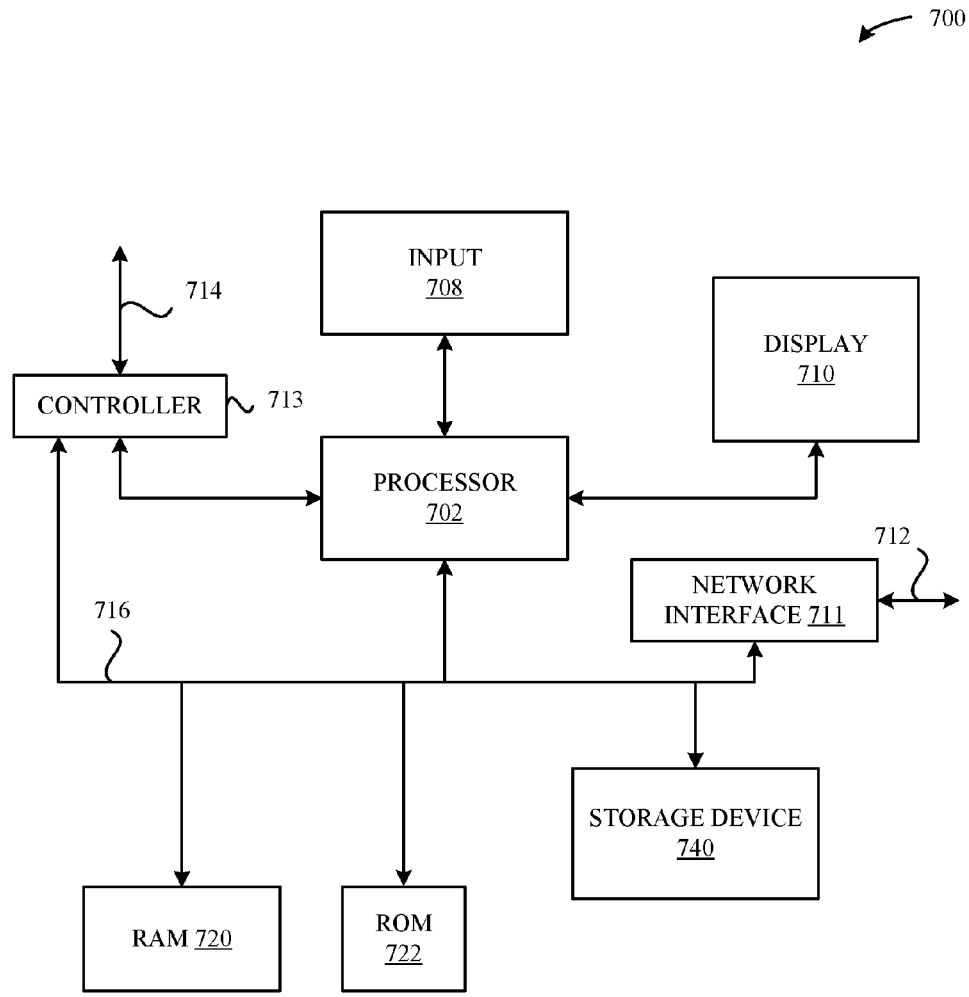
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the user device 110 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user (for example, web page data described herein). A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g. hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for predicting resources required to render web pages, the method comprising, at a mobile computing device on which a web browser is executing:
   receiving a first request to load a main resource associated with a web page;
   retrieving metadata associated with the main resource from a cache managed on the mobile computing device;
   identifying, based on the metadata, a set of sub-resources associated with the main resource;
   generating a prediction that a subset of the set of sub-resources will be needed to render the web page, wherein the subset includes at least one sub-resource included in the set; and
   for each sub-resource in the subset:
      obtaining the sub-resource from the cache in response to determining that (i) the sub-resource is stored in the cache, and (ii) a condition associated with the sub-resource is satisfied, otherwise
      communicating, to a resource-based server, a respective request for the sub-resource.

2. The method of claim 1, wherein the metadata comprises dependency information associated with the main resource and the set of sub-resources.

3. The method of claim 2, further comprising:
   receiving an initial request for the main resource prior to the first request; and
   in response to the initial request:
      generating the dependency information associated with the main resource and the set of sub-resources, and
      saving the dependency information in the cache.

4. The method of claim 1, wherein the resource-based server is a web server.

5. The method of claim 1, further comprising:
   determining whether the metadata associated with the main resource exists in the cache, and performing the steps of retrieving, identifying, generating, and communicating in response to a determination that the metadata associated with the main resource exists in the cache.

6. The method of claim 1, further comprising:
determining whether the at least one sub-resource included in the prediction was used to render the web page.

7. The method of claim 6, further comprising:
updating the metadata associated with the main resource in response to a determination that the at least one sub-resource was used to render the web page.

8. The method of claim 7, wherein updating the metadata further comprises:
updating a counter value associated with the at least one sub-resource.

9. A system, comprising:
a web server; and
a user device communicably coupled to the web server, wherein the user device executes a web browser configured to:
 receive a first request to load a main resource associated with a web page;
 retrieve metadata associated with the main resource, from a cache managed on the user device;
 identify, based on the metadata, a set of sub-resources associated with the main resource;
 generate a prediction that a subset of the set of sub-resources will be needed to render the web page, wherein the subset includes at least one sub-resource included in the set; and
 for each sub-resource in the subset:
  obtain the sub-resource from the cache in response to determining that (i) the sub-resource is stored in the cache, and (ii) a condition associated with the sub-resource is satisfied, otherwise
  communicate, to a resource-based server, a respective request for the sub-resource.

10. The system of claim 9, wherein the metadata comprises dependency information associated with the main resource and the set of sub-resources.

11. The system of claim 10, wherein the user device is further configured to:
receive an initial request for the main resource prior to the first request; and
in response to the initial request:
 generate the dependency information associated with the main resource and the set of sub-resources, and
 save the dependency information in the cache.

12. The system of claim 10, wherein the user device is further configured to:
determine whether the metadata associated with the main resource exists in the cache, and
perform the steps of retrieving, identifying, generating, and communicating in response to a determination that the metadata associated with the main resource exists in the cache.

13. The system of claim 10, wherein the user device is further configured to:
determine whether the at least one sub-resource included in the prediction was used to render the web page.

14. The system of claim 13, wherein the user device is further configured to:
update the metadata associated with the main resource in response to a determination that the at least one sub-resource was used to render the web page.

15. A non-transitory computer readable storage medium configured to store instructions that, when executed by a processor included in a user device, cause the user device to predict resources needed to render a web page, by carrying out steps that include:
receiving a first request to load a main resource associated with the web page;
retrieving metadata associated with the main resource from a cache managed on the user device;
identifying a set of sub-resources associated with the main resource based on metadata associated with the main resource;
generating a prediction that a subset of the set of sub-resources will be needed to render the web page, wherein the subset includes at least one sub-resource included in the set; and
for each sub-resource in the subset:
 obtaining the sub-resource from the cache in response to determining that (i) the sub-resource is stored in the cache, and (ii) a condition associated with the sub-resource is satisfied, otherwise
 communicating, to a resource-based server, a respective request for the sub-resource.

16. The non-transitory computer readable storage medium of claim 15, wherein the resource-based server is a web server.

17. The non-transitory computer readable storage medium of claim 15, wherein the metadata comprises dependency information associated with the main resource and the set of sub-resources.

18. The non-transitory computer readable storage medium of claim 15, wherein the steps further include:
determining whether the metadata associated with the main resource exists in the cache, and
carrying out the steps of retrieving, identifying, generating, and communicating in response to a determination that the metadata associated with the main resource exists in the cache.

19. The non-transitory computer readable storage medium of claim 15, wherein the steps further include:
determining whether the at least one sub-resource included in the prediction was used to render the web page.

20. The non-transitory computer readable storage medium of claim 19, wherein the steps further include:
updating the metadata associated with the main resource in response to a determination that the at least one sub-resource was used to render the web page.

* * * * *